(12) United States Patent
Yamamoto

(10) Patent No.: US 7,290,579 B2
(45) Date of Patent: Nov. 6, 2007

(54) PNEUMATIC TIRE FOR MOTORCYCLE

(75) Inventor: Masahiko Yamamoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/568,340

(22) PCT Filed: Jul. 12, 2004

(86) PCT No.: PCT/JP2004/009927

§ 371 (c)(1),
(2), (4) Date: Feb. 14, 2006

(87) PCT Pub. No.: WO2005/018959

PCT Pub. Date: Mar. 3, 2005

(65) Prior Publication Data

US 2006/0266457 A1  Nov. 30, 2006

(30) Foreign Application Priority Data

Aug. 21, 2003 (JP) ............... 2003-297581

(51) Int. Cl.
B60C 15/04 (2006.01)

(52) U.S. Cl. .................................... 152/540

(58) Field of Classification Search ............... 152/540; 245/1.5
See application file for complete search history.

(56) References Cited

U.S. PATENT DOCUMENTS 3,736,974 A * 6/1973 LeJeune ............ 152/540
4,057,091 A * 11/1977 Gardner et al. ....... 152/540 X

FOREIGN PATENT DOCUMENTS

| JP | 34-8805 Y1 | 6/1959 |
| JP | 6-22004 U | 3/1994 |
| JP | 11-321247 A | 11/1999 |
| JP | 2002-254910 A | 9/2002 |

* cited by examiner

Primary Examiner—Adrienne C. Johnstone
(74) Attorney, Agent, or Firm—Sughrue Mion Pllc.

(57) ABSTRACT

This invention relates to a pneumatic tire for a motorcycle improving a cornering stability, and more particularly to a pneumatic tire for a motorcycle comprising a pair of bead portions 2, a carcass 1 wound around a bead core 3 embedded in the respective bead portion, a tread portion arranged on an outside of a crown portion of the carcass and a pair of sidewall portions extending inward from both ends of the tread portion in a radial direction of the tire, in which the bead core 3 is a cable bead and a geometric second moment coefficient $\Sigma(\pi/64 \times d^4)$ of the bead core 3 (wherein d is a diameter of each filament constituting the bead core) satisfies an equation of $0.50 < \Sigma(\pi/64 \times d^4) < 1.50$.

2 Claims, 3 Drawing Sheets

PNEUMATIC TIRE FOR MOTORCYCLE

TECHNICAL FIELD

This invention relates to a pneumatic tire for a motorcycle (hereinafter referred to as "motorcycle tire" or "tire" simply), and more particularly to a pneumatic tire for a motorcycle in which the running stability is improved while enhancing the durability by improving a bead core.

BACKGROUND ART

The motorcycle has a great feature different from a four-wheeled vehicle in a point that the vehicle body is largely inclined in the running on a corner. For this end, the tire applied to the motorcycle is required to be excellent in the running stability during the cornering. As a technique for ensuring the running stability during the cornering, it is effective to improve the ground contacting property of the tire. From a viewpoint of the improvement of the ground contacting property, it is preferable that the deformation of not only the tread rubber for the tire but also the carcass inside the tire is easy.

As a way for facilitating the deformation of the carcass, it is effective that the deformation of a carcass ply wound around a bead core is allowed to a certain level in an axial direction of the tire. For this end, it is usually required to lower the distortion rigidity of the bead core. If it is intended to realize this requirement by decreasing the winding number of the wire, the fracture strength of the bead portion lowers. In the motorcycle tire, it is difficult to simultaneously establish the ground contacting property of the tire and the safety of the bead portion. Therefore, it is desired to develop a technique capable of sufficiently ensuring the running stability during the cornering.

On the other hand, JP-A-2002-254910 discloses a technique that the deformation of the carcass ply around the bead core can be allowed without lowering the distortion rigidity of the bead core by arranging an innerliner rubber layer enclosing the bead core along the carcass ply between the carcass ply and the bead core to render a compression ratio of the bead portion into a predetermined range.

In the tires for passenger car, so-called cable bead is applied to the bead core for reinforcing the bead portion to realize the stable running property (see JP-A-06-21100). The cable bead means a bead core having a structure that one or more sheath layers are helically wound around a single welded core wire. However, a cable bead comprising two or more sheath layers has not hitherto been used in the motorcycle tire because a region capable of arranging the bead core is narrower. An example of applying a cable bead comprising one sheath layer around the core wire to the motorcycle tire is disclosed, for example in JP-A-2002-254910.

DISCLOSURE OF THE INVENTION

As mentioned above, it is demanded in the pneumatic tire for the motorcycle to develop a technique that the running stability in the cornering can be improved by simultaneously establishing the improvement of the ground contacting property and the improvement of the safety in the bead portion. It is, therefore, an object of the invention to provide a pneumatic tire for a motorcycle in which the bead core is improved to balance the ground contacting property in the cornering and the safety in the bead portion to thereby improve the cornering stability.

The inventors have made various studies for solving the above problems and found that it is effective to define a geometric second moment coefficient of the bead core to a predetermined range for attaining the establishment of the ground contacting property and the strength of the bead portion, and as a result, the invention has been accomplished.

According to the invention, there is the provision of a pneumatic tire for a motorcycle comprising a pair of bead portions, a carcass wound around a bead core embedded in the respective bead portion, a tread portion arranged on an outside of a crown portion of the carcass and a pair of sidewall portions extending inward from both ends of the tread portion in a radial direction of the tire, in which the bead core is a cable bead and a geometric second moment coefficient $\Sigma(\pi/64 \times d^4)$ of the bead core (wherein d is a diameter of each filament constituting the bead core) satisfies an equation of $0.50 < \Sigma(\pi/64 \times d^4) < 1.50$.

In the invention, it is preferable that the bead core is a multi-layer cable bead, particularly two-layer cable bead.

According to the above construction of the invention, the carcass is easily moved in the axial direction of the tire to improve the ground contacting property under a camber load in the cornering, while the safety of the bead portion can be ensured within an adequate range to enhance the safety, whereby it is made possible to realize a pneumatic tire for a motorcycle improving the cornering stability without lowering the safety of the bead core.

BEST MODE FOR CARRYING OUT THE INVENTION

Figure 1:
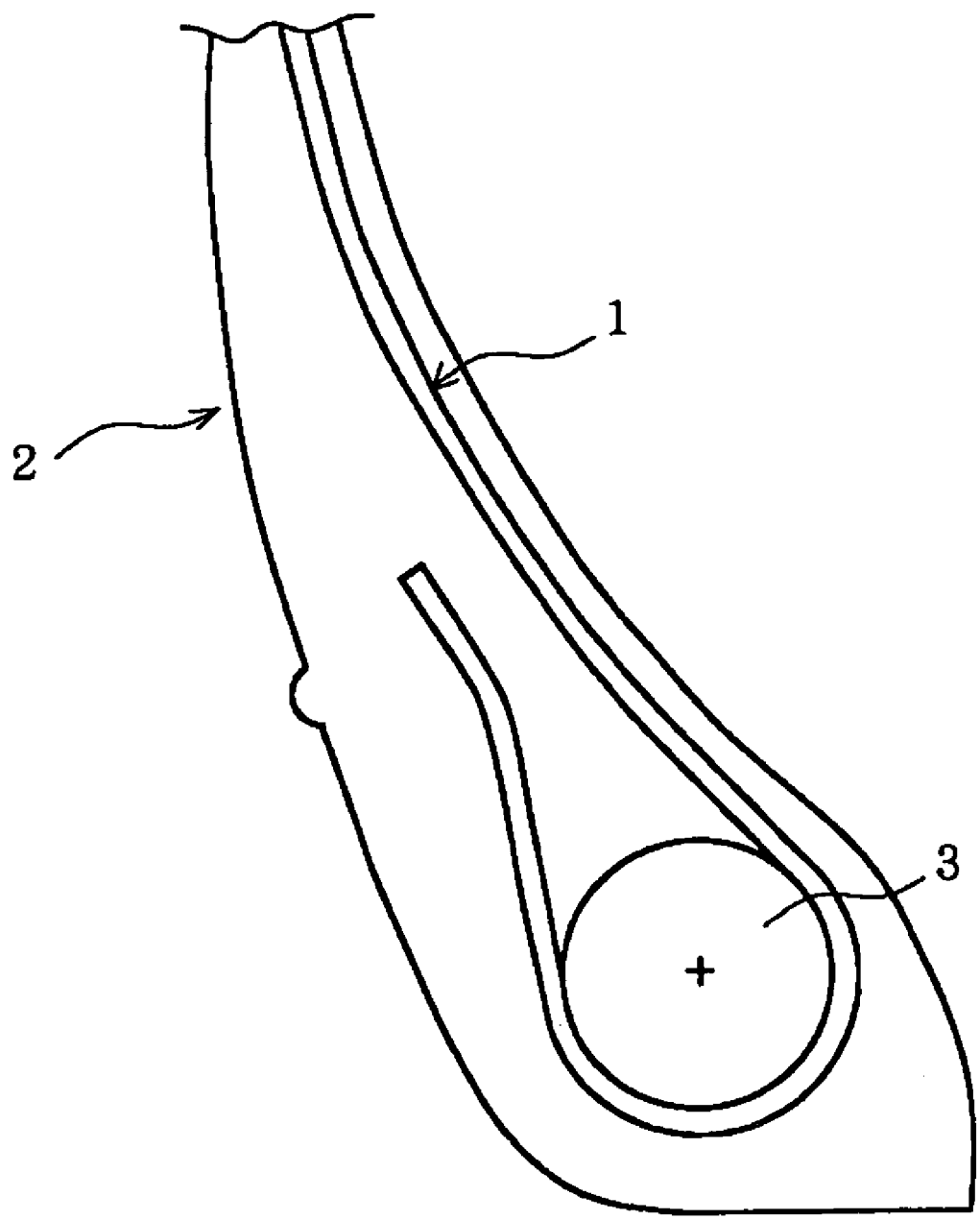
FIG. 1 is an enlarged section view showing a vicinity of a bead portion in the pneumatic tire for the motorcycle according to the invention.

A best mode of an embodiment of the invention will be concretely explained with reference to the drawings below. As shown in FIG. 1, the pneumatic tire for the motorcycle according to the invention comprises a pair of bead portions 2, a carcass 1 wound around a bead core 3 embedded in the respective bead portion, a tread portion arranged on an outside of a crown portion of the carcass but not shown, and a pair of sidewall portions extending inward from both ends of the tread portion in a radial direction of the tire. In the invention, it is important that the bead core 3 is a cable bead and a geometric second moment coefficient $\Sigma(\pi/64 \times d^4)$ thereof satisfies an equation of $0.50 < \Sigma(\pi/64 \times d^4) < 1.50$.

The geometric second moment coefficient $\Sigma(\pi/64 \times d^4)$ of the bead core 3 means a sum of geometric second moment coefficients of filaments around a core constituting the bead core 3, and d is a diameter of each filament around the core constituting the bead core 3. When the bead core 3 is the cable bead and has the geometric second moment coefficient of the above range, the ground contacting property can be enhanced without damaging the safety of the bead portion and the good cornering stability can be obtained.

In the invention, the concrete structure, material and the like of each member of the tire other than the bead core are not particularly limited as far as the geometric second moment coefficient of the bead core 3 using the cable bead satisfies the above range. Preferably, the bead core 3 is a multi-layer cable bead. As previously mentioned, the multi-layer cable bead comprising two or more sheath layers has not hitherto been used as a bead core in the motorcycle tire. On the contrary, the inventors have found that the multi-layer cable bead can be preferably used in the motorcycle tire according to the invention from the following reasons.

Figure 3:
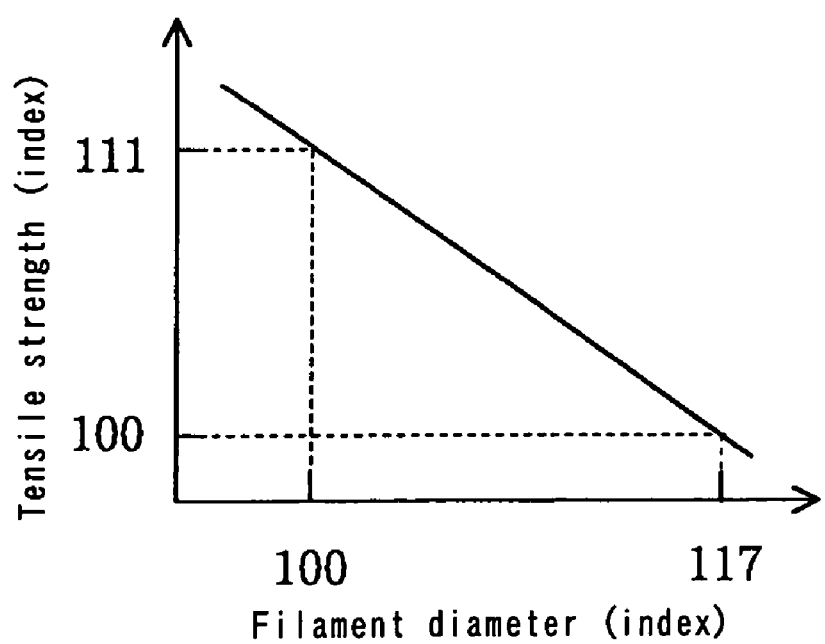
FIG. 3 is a graph showing a relation between a diameter of a wire and a tensile strength.
Figure 4:
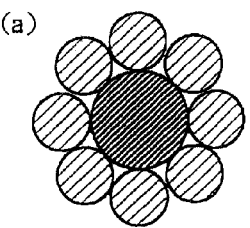
FIG. 4 is an enlarged section view showing a structure of a bead core (cable bead) of each of Examples 1-3 and Comparative Examples 1-3.
Figure 4:
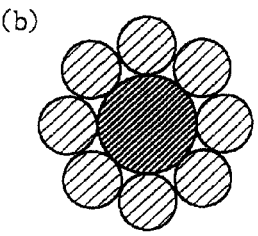
Figure 4:
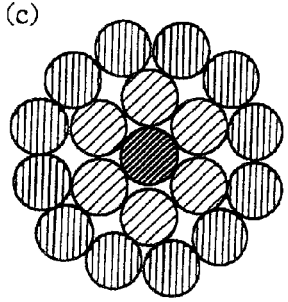
Figure 4:
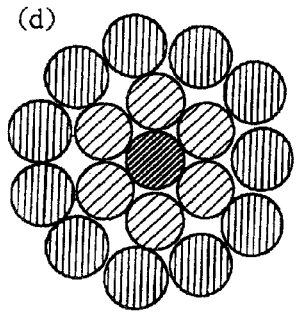
Figure 4:
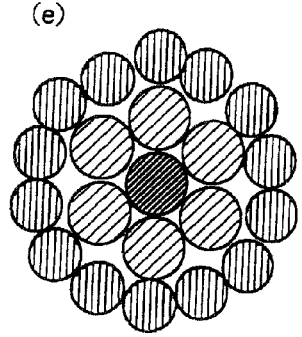
Figure 4:
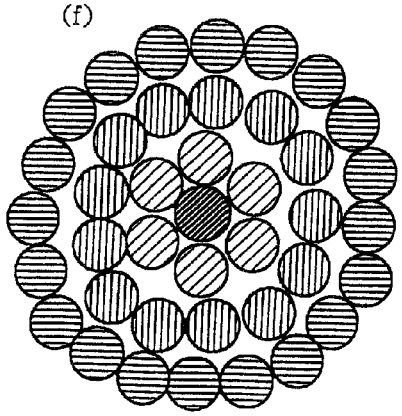

As seen from a graph of FIG. 3 showing a relation between filament diameter and tensile strength, as the diameter of the wire filament prepared from the same material is made thinner by drawing, the strength (tensile strength) per unit sectional area becomes generally higher. Also, it is considered that the strength utilizing ratio in the sheath layer is excellent in the filaments of the multi-sheath layers wound so as to cross with each other as compared with the filaments of the single sheath layer wound around the core wire in one direction because stress acting to the whole of the bead portion is dispersed uniformly. Owing to these two factors, the multi-layer cable bead is possible to enhance the safety at the same weight as compared with the single layer cable bead, while even at the same safety, it is possible to reduce the weight of the bead core. In the motorcycle tire, therefore, it is considered that it is possible to increase the strength of the bead portion more efficiently by using the multi-layer cable bead.

Also, the cable bead has a ring shape formed by helically winding the wire filaments as previously mentioned, so that it is possible to smoothen the carcass centering on the axial center of the bead core as compared with the usual bead core having a polygonal shape in section. That is, the effect of improving the ground contacting property can also be obtained by using the cable bead as a bead core.

As the multi-layer cable bead is preferable a two-layer cable bead though the number of sheath layers may be two or more. Because, when the diameter of the wire filament is fine to an extent required for the formation of three sheath layers, the bending rigidity of the bead core becomes extremely low and hence the disorder of the filaments becomes large in the shaping step of the bead core or the production step of the tire and there is a tendency of decreasing the strength utilizing ratio.

Figure 2:
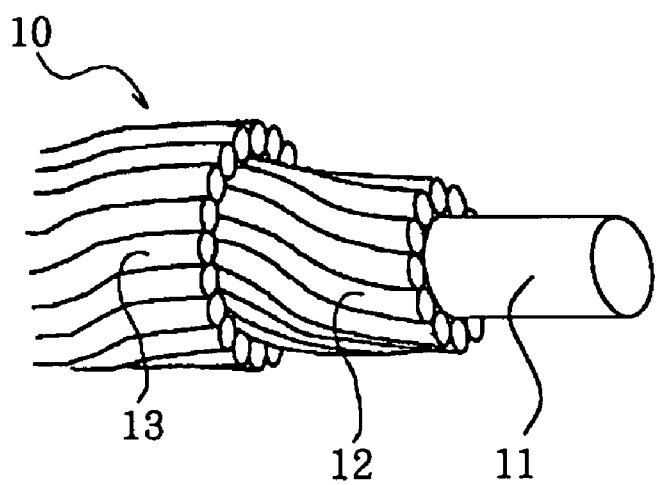
FIG. 2 is an enlarged perspective view showing an embodiment of a two-layer cable bead.

In FIG. 2 is shown an example of the two-layer bead cable. The illustrated two-layer bead cable 10 is formed by sequentially winding a first sheath layer 12 and a second sheath layer 13 around a core wire 11. The number of filaments and filament diameter of each sheath layer in the multi-layer cable bead are not particularly limited as far as the geometric second moment coefficient of the bead core satisfies the above-defined range. In case of the illustrated two-layer cable bead 10, the number of filaments in the first sheath layer 12 is usually 5-7 and that in the second sheath layer 13 is about 10-16. Also, the filament diameter is 1.0-1.5 mm in the core wire 11, 0.9-1.4 mm in the first sheath layer 12, and 0.9-1.4 mm in the second sheath layer 13.

The invention will be described concretely with reference to the following examples below.

EXAMPLES 1-3 AND COMPARATIVE EXAMPLES 1-3

There are prepared pneumatic tires for motorcycle having a tire size of 120/70R17 by using a structure of a bead core (cable bead) shown in Table 1 and FIGS. 4(a)-(f). With respect to the thus obtained tires, the geometric second moment coefficient $\Sigma(\pi/64 \times d^4)$ of the bead core is measured and the following test for the stability in the cornering is made to obtain results as shown in Table 1.

The test for the stability in the cornering is carried out by assembling each test tire into a rim of MT3.5×17 and adjusting an air pressure to 200 kPa and mounting on a rear wheel of a motorcycle having a displacement of 125 cc to conduct a feeling evaluation. Concretely, the tire of each of the examples and comparative examples is mounted on the rear wheel under a condition that a tire for front wheel is the same and run at a speed of 80 km/h on a cornering course to evaluate a steady state of rigidity as an indication of stability in cornering by a driver's feeling, which is represented by an index on the basis that the tire of Comparative Example 1 is 100.

TABLE 1

| | | | Comparative Example 1 | Comparative Example 2 | Example 1 | Example 2 | Example 3 | Comparative Example 3 |
|---|---|---|---|---|---|---|---|---|
| Structure of bead core | Diameter of core wire (mm) | | 2.20 | 2.40 | 1.20 | 1.20 | 1.20 | 0.8 |
| | First sheath layer | Diameter (mm) | 1.40 | 1.60 | 0.96 | 0.96 | 1.20 | 0.7 |
| | | Number of Filaments | 8 | 8 | 6 | 6 | 6 | 6 |
| | Second sheath layer | Diameter (mm) | — | — | 0.96 | 1.20 | 0.96 | 0.7 |
| | | Number of Filaments | — | — | 12 | 11 | 14 | 13 |
| | Third sheath layer | Diameter (mm) | — | — | — | — | — | 0.7 |
| | | Number of Filaments | — | — | — | — | — | 20 |
| Section view (FIG. 4) | | | (a) | (b) | (c) | (d) | (e) | (f) |
| Geometric second moment coefficient | | | 1.51 | 2.57 | 0.75 | 1.37 | 1.19 | 0.46 |
| Stability in cornering (index) | | | 100 | 90 | 110 | 120 | 115 | 90 |

INDUSTRIAL APPLICABILITY

As mentioned above, according to the invention, there can be realized a pneumatic tire for a motorcycle in which the cornering stability can be improved by improving the bead core to balance the ground contacting property in the cornering and the safety of the bead portion.

The invention claimed is:

1. A pneumatic tire for a motorcycle comprising a pair of bead portions, a carcass wound around a bead core embedded in the respective bead portion, a tread portion arranged on an outside of a crown portion of the carcass and a pair of sidewall portions extending inward from both ends of the tread portion in a radial direction of the tire, in which the bead core is a cable bead and a geometric second moment coefficient $\Sigma(\pi/64 \times d^4)$ of the bead core (wherein d is a diameter of each filament constituting the bead core except for a core wire) satisfies an equation of $0.50 < \Sigma(\pi/64 \times d^4) < 1.50$, wherein the bead core is a multi-layer cable bead.

2. A pneumatic tire for a motorcycle according to claim 1, wherein the bead core is a two-layer cable bead.

* * * * *